(12) United States Patent
Zhang et al.

(10) Patent No.: US 11,736,212 B2
(45) Date of Patent: Aug. 22, 2023

(54) CROSS-LINK INTERFERENCE (CLI) ENHANCEMENTS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 17/229,756

(22) Filed: Apr. 13, 2021

(65) Prior Publication Data

US 2021/0328692 A1    Oct. 21, 2021

Related U.S. Application Data

(60) Provisional application No. 63/011,200, filed on Apr. 16, 2020.

(51) Int. Cl.
*H04B 17/345* (2015.01)
*H04W 24/10* (2009.01)

(52) U.S. Cl.
CPC .......... *H04B 17/345* (2015.01); *H04W 24/10* (2013.01)

(58) Field of Classification Search
CPC .... H04B 17/24; H04B 17/345; H04B 7/0617; H04B 7/088; H04L 5/0048; H04L 5/0073; H04L 5/1469; H04L 5/0023; H04W 24/10; H04W 72/046; H04W 72/082
See application file for complete search history.

(56) References Cited

U.S. PATENT DOCUMENTS

2021/0289485 A1*  9/2021  Guan .................. H04B 7/0617

FOREIGN PATENT DOCUMENTS

WO       2020065891 A1     4/2020
WO    WO-2020065891 A1 *  4/2020

OTHER PUBLICATIONS

Intel Corporation: ("UE-to-UE CLI measurement and reporting"; R1-1900489; 3GPP TSG RAN WG1 Ad-Hoc Meeting 1901; Jan. 21-Jan. 25, 2019; Taipei, China (Year: 2019).*
International Search Report and Written Opinion—PCT/US2021/027363—ISA/EPO—dated Jul. 7, 2021.

(Continued)

*Primary Examiner* — Melvin C Marcelo
*Assistant Examiner* — Natali Pascual Peguero
(74) *Attorney, Agent, or Firm* — Qualcomm Incorporated/Seyfarth Shaw LLP

(57) ABSTRACT

A method of wireless communication is presented. The method includes receiving, at a user equipment (UE) from a base station, a measurement configuration comprising quasi-co-location (QCL) information for a serving reception beam. The method also includes measuring cross-link interference experienced on the serving reception beam. The method further includes transmitting the QCL information for the serving reception beam and a corresponding sounding reference signal-reference signal received power (SRS-RSRP) or cross-link information-received signal strength indicator (CLI-RSSI) to the base station.

28 Claims, 6 Drawing Sheets

(56) References Cited

OTHER PUBLICATIONS

Intel Corporation: "UE-to-UE CLI Measurement and Reporting", 3GPP Draft, 3GPP TSG RAN WG1 Ad-Hoc Meeting 1901, R1-1900489, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019 Jan. 20, 2019 (Jan. 20, 2019), XP051593402, 5 Pages, Retrieved from the Internet: URL: https://www.3gpp.org/ftp/TSG_RAN/WG1_RL1/TSGR1_AH/NR_AH_1901/Docs/R1-1900489.zip [retrieved on Jan. 20, 2019], p. 2/5 p. 3/5 3.3, The whole document.

* cited by examiner

CROSS-LINK INTERFERENCE (CLI) ENHANCEMENTS

CROSS-REFERENCE TO RELATED APPLICATION

The present application claims priority to U.S. Provisional Patent Application No. 63/011,200, filed on Apr. 16, 2020, and titled "CROSS-LINK INTERFERENCE (CLI) ENHANCEMENTS," the disclosure of which is expressly incorporated by reference in its entirety.

FIELD OF THE DISCLOSURE

Aspects of the present disclosure generally relate to wireless communications, and more particularly to techniques and apparatuses for reporting cross-link interference (CLI).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. Improved interference mitigation in LTE and/or NR remain useful.

SUMMARY

In one aspect of the present disclosure, a method for wireless communication by a first user equipment (UE) includes receiving, from a base station, a first reference signal measurement configuration comprising first quasi-co-location (QCL) information for a first serving reception beam. The method further includes measuring a first sounding reference signal (SRS) received from a second UE neighboring the first UE on the first serving reception beam. The method still further includes determining a cross-link interference (CLI) metric based on at least the measurement of the first SRS. The method also includes transmitting, to the base station, a CLI measurement report comprising the first QCL information and the CLI metric.

Another aspect of the present disclosure is directed to an apparatus for wireless communication by a first UE. The apparatus includes means for receiving, from a base station, a first reference signal measurement configuration comprising first QCL information for a first serving reception beam. The apparatus further includes means for measuring a first SRS received from a second UE neighboring the first UE on the first serving reception beam. The apparatus still further includes means for determining a CLI metric based on at least the measurement of the first SRS. The apparatus also includes means for transmitting, to the base station, a CLI measurement report comprising the first QCL information and the CLI metric.

In another aspect of the present disclosure, a non-transitory computer-readable medium with non-transitory program code recorded thereon for wireless communication by a first UE is disclosed. The program code is executed by a processor and includes program code to receive, from a base station, a first reference signal measurement configuration comprising first QCL information for a first serving reception beam. The program code further includes program code to measure a first SRS received from a second UE neighboring the first UE on the first serving reception beam. The program code still further includes program code to determine a CLI metric based on at least the measurement of the first SRS. The program code also includes program code to transmit, to the base station, a CLI measurement report comprising the first QCL information and the CLI metric.

Another aspect of the present disclosure is directed to an apparatus for wireless communications at a first UE. The apparatus includes a processor, a memory coupled with the processor, and instructions stored in the memory and operable, when executed by the processor, to cause the apparatus to receive, from a base station, a first reference signal measurement configuration comprising first QCL information for a first serving reception beam. The instructions also cause the apparatus to measure a first SRS received from a second UE neighboring the first UE on the first serving reception beam. The instructions further cause the apparatus to determine a CLI metric based on at least the measurement of the first SRS. The instructions still further cause the apparatus to transmit, to the base station, a CLI measurement report comprising the first QCL information and the CLI metric.

In one aspect of the present disclosure, a method for wireless communication by a base station includes transmitting, to a first UE, a first reference signal measurement configuration for a first SRS resource, the first reference signal measurement configuration including first QCL information for a first serving reception beam. The method further includes receiving, from the first UE, a CLI measurement report including a CLI metric and the first QCL information. The CLI metric may be based on an SRS measurement of the first serving reception beam.

Another aspect of the present disclosure is directed to an apparatus for wireless communication by a base station. The apparatus includes means for transmitting, to a first UE, a first reference signal measurement configuration for a first SRS resource, the first reference signal measurement configuration including first QCL information for a first serving reception beam. The apparatus further includes means for receiving, from the first UE, a CLI measurement report including a CLI metric and the first QCL information. The CLI metric may be based on an SRS measurement of the first serving reception beam.

In another aspect of the present disclosure, a non-transitory computer-readable medium with non-transitory program code recorded for wireless communication by a base station thereon is disclosed. The program code is executed by a processor and includes program code to transmit, to a first UE, a first reference signal measurement configuration for a first SRS resource, the first reference signal measurement configuration including first QCL information for a first serving reception beam. The program code further includes program code to receive, from the first UE, a CLI measurement report including a CLI metric and the first QCL information. The CLI metric may be based on an SRS measurement of the first serving reception beam.

Another aspect of the present disclosure is directed to an apparatus for wireless communications at a base station. The apparatus includes a processor, a memory coupled with the processor, and instructions stored in the memory and operable, when executed by the processor, to cause the apparatus to transmit, to a first UE, a first reference signal measurement configuration for a first SRS resource, the first reference signal measurement configuration including first QCL information for a first serving reception beam. Execution of the instructions also cause the apparatus to receive, from the first UE, a CLI measurement report comprising a CLI metric and the first QCL information. The CLI metric may be based on an SRS measurement of the first serving reception beam.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
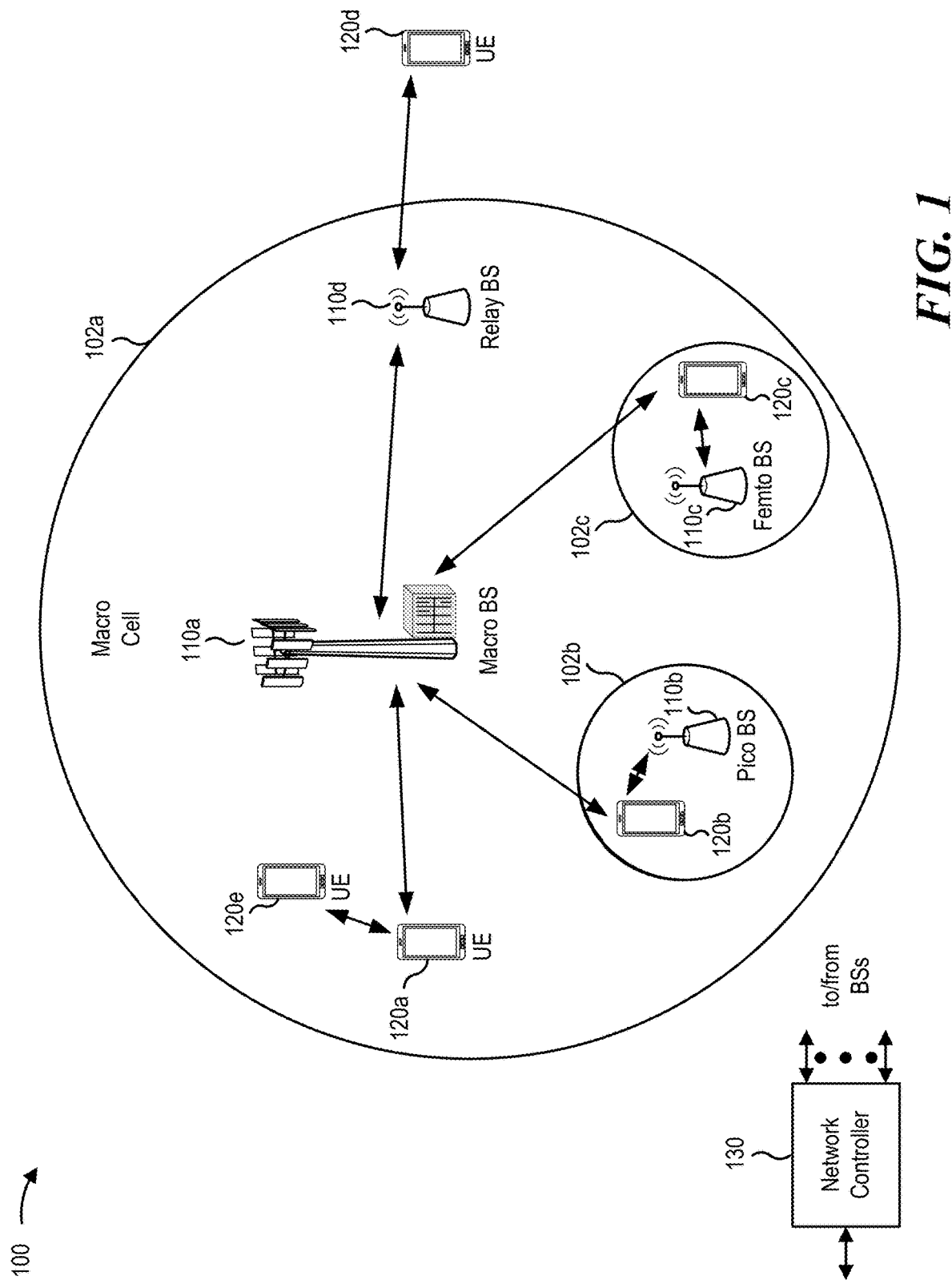
FIG. 1 is a block diagram conceptually illustrating an example of a wireless communications network, in accordance with various aspects of the present disclosure.

Various aspects of the disclosure are described below with reference to the accompanying drawings. This disclosure may, however, be embodied in many different forms and should not be construed as limited to any specific structure or function presented throughout this disclosure. Rather, these aspects are provided so that this disclosure will be thorough and complete, and will convey the scope of the disclosure to those skilled in the art. Based on the teachings herein one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In conventional systems, for cross-link interference (CLI) measurements, a sounding reference signal (SRS) configuration may be transmitted to a transmitting device, such as a transmitting user equipment (UE), and may only include spatial relation information for a transmission beam. An SRS configuration transmitted to a receiving device, such as a receiving UE, may not include spatial relation information, such as quasi-co-location (QCL) information, for a serving reception beam. Therefore, in such systems, the serving reception beam used for receiving an SRS at the UE may vary based on the UE's implementation. Thus, it may be difficult for the base station to measure CLI for a specific serving reception beam. It may be desirable for a base station to identify spatial relation information for a serving reception beam to improve CLI measurements. The improved CLI measurements may improve interference mitigation.

Aspects of the present disclosure are directed to including QCL information for a serving reception beam in a reference signal measurement configuration, such as an SRS measurement configuration. Aspects of the present disclosure are also directed to a UE transmitting a CLI measurement report with a CLI metric based on an SRS measured for a serving reception beam and the QCL information for the serving reception beam. In some aspects, the CLI metric includes one or both of a sounding reference signal-reference signal received power (SRS-RSRP) or a cross-link information-received signal strength indicator (CLI-RSSI) of a serving reception beam on a given SRS resource.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
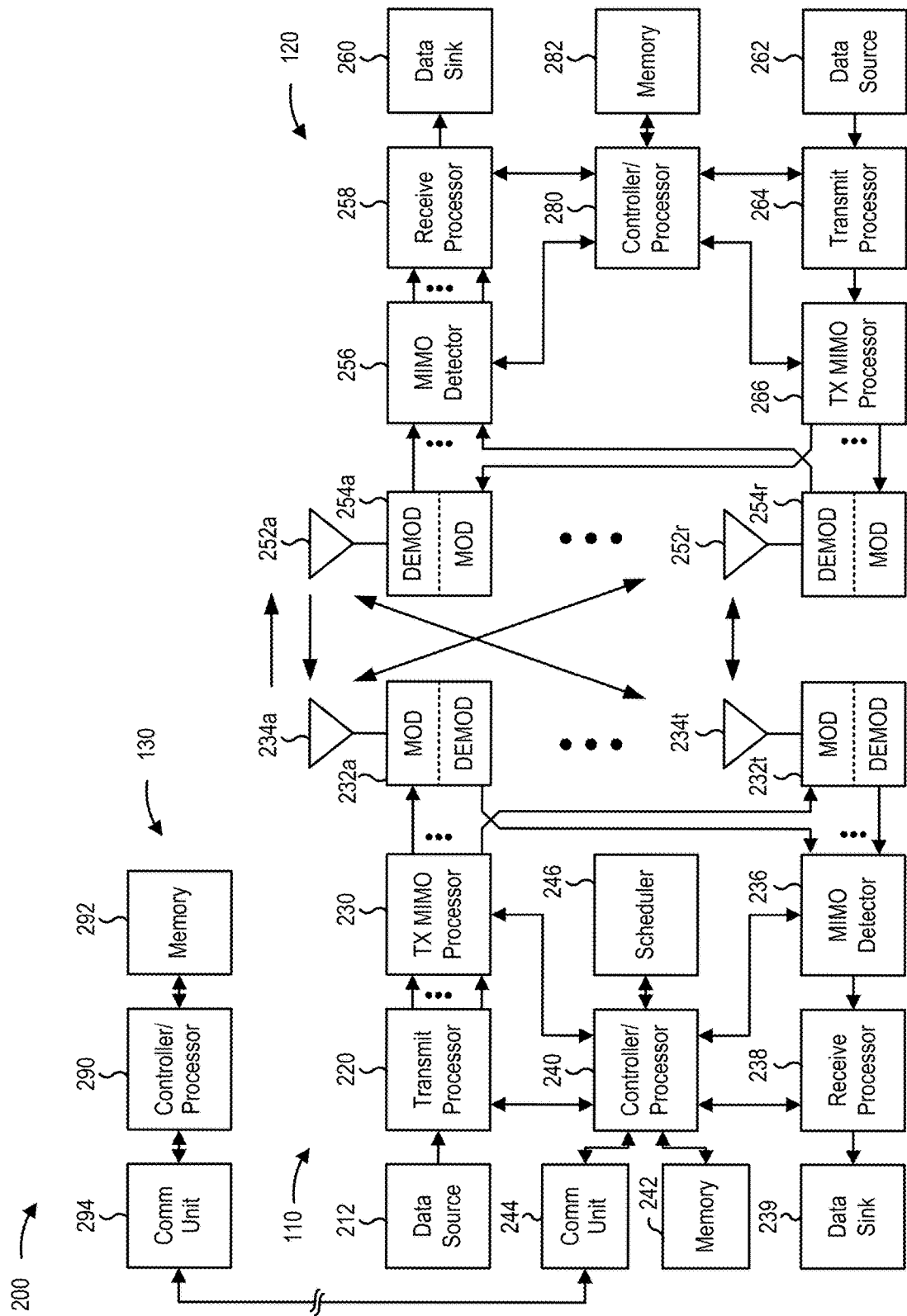
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for non-linearities, as described in more detail elsewhere. For example, the controller/processor 240 of the base station 110, the controller/processor 280 of the UE 120, and/or any other component(s) of FIG. 2 may perform or direct operations of, for example, the processes of FIGS. 6-8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, from a base station, a first reference signal measurement configuration comprising QCL information for a serving reception beam; means for measuring an SRS received from a second UE neighboring the first UE on the serving reception beam; means for determining a CLI metric based on at least the measurement of the SRS; and means for transmitting, to the base station, a CLI measurement report comprising the QCL information and the CLI metric.

In some aspects, the base station 110 may include means for transmitting, to a UE, a reference signal measurement configuration for an SRS resource, the reference signal measurement configuration comprising QCL information for a serving reception beam; and means for receiving, from the first UE, a CLI measurement report comprising a CLI metric and the first QCL information, the CLI metric based on an SRS measurement of the first serving reception beam.

Such means may include one or more components of the UE 120 or base station 110 described in connection with FIG. 2.

As indicated above, FIG. 2 is provided merely as an example. Other examples may differ from what is described with regard to FIG. 2.

In wireless communication systems, cross-link interference (CLI) may be experienced when two or more UEs are configured to communicate with different uplink/downlink (UL/DL) slot formats. An UL/DL slot format may be referred to as a time division duplex (TDD) configuration or a TDD UL/DL configuration. As an example, a first UE may be within communication range of a second UE. In such an example, the second UE may be an example of a neighboring UE. In one such example, uplink transmissions from the second UE interfere with downlink transmissions of the first UE if the first UE and the second UE are configured with different TDD configurations. For ease of explanation, the first UE may be referred to as a victim UE, and the second UE may be referred to as an aggressor UE. In the current example, interference may be caused based on an uplink symbol (e.g., interfering symbol) of the aggressor UE colliding with a downlink symbol of the victim UE.

The CLI can be caused by any uplink transmission from the aggressor UE. Additionally, the CLI may include inter-cell interference and/or intra-cell interference. For example, different semi-static TDD configurations in different cells may cause inter-cell CLI. As another example, different UE-specific dynamic TDD configurations within a same cell may cause intra-cell CLI interference.

Figure 3A:
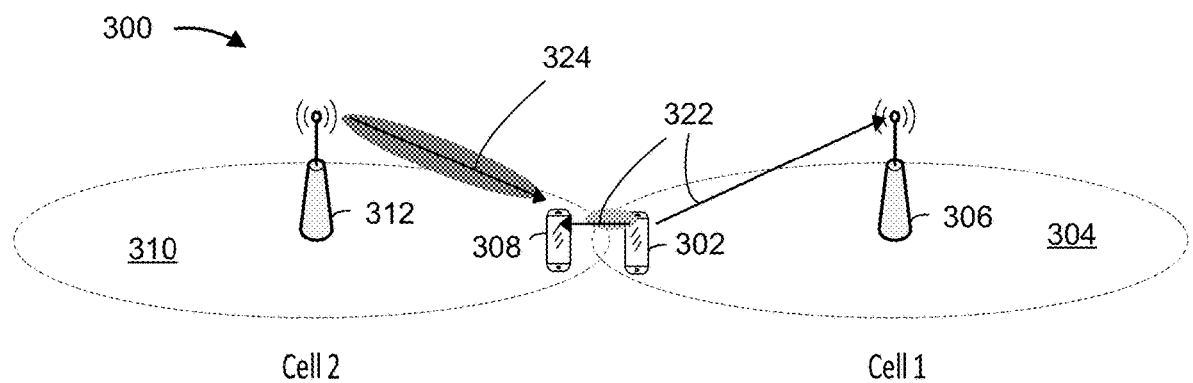
FIGS. 3A and 3B illustrate examples of inter-cell interference, in accordance with aspects of the present disclosure.

FIG. 3A illustrates an example 300 of inter-cell interference, in accordance with aspects of the present disclosure. In the example of FIG. 3A, an aggressor UE 302 is associated with a first cell 304, such that the aggressor UE 302 communicates with a first base station 306. Additionally, in FIG. 3A, a victim UE 308 is associated with a second cell 310, such that the victim UE 308 communicates with a second base station 312.

In the current example, the aggressor UE 302 and the victim UE 308 may have different TDD configurations. That is, the aggressor UE 302 has a first TDD configuration 314, and the victim UE 308 has a second TDD configuration 316. Therefore, a downlink transmission 324 received at the victim UE 308 may experience CLI based on an uplink transmission 322 from the aggressor UE 302. As described, CLI may occur when uplink symbols 318 of the first TDD configuration 314 collide with downlink symbols 320 of the second TDD configuration 316.

Figure 3B:
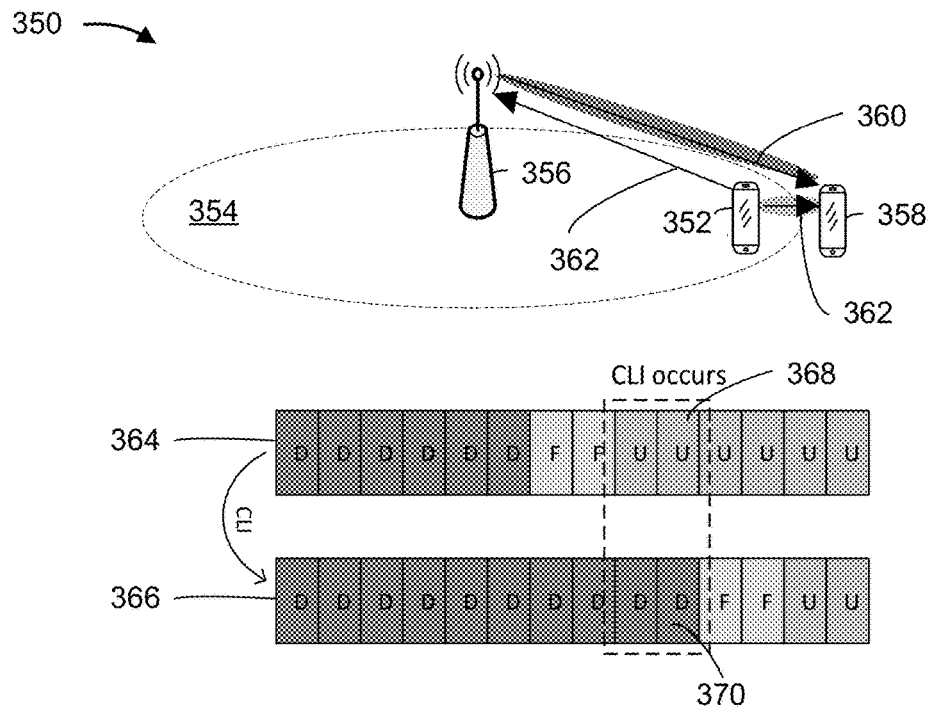

FIG. 3B illustrates an example 350 of intra-cell interference, in accordance with aspects of the present disclosure. As shown in FIG. 3B, an aggressor UE 352 and a victim UE 358 are within a same cell 354, such that the aggressor UE 352 and the victim UE 358 both communicate with a same base station 356.

In the example of FIG. 3B, the aggressor UE 352 has a first TDD configuration 364 and the victim UE 358 has a second TDD configuration 366. CLI may occur when uplink symbols 368 of the first TDD configuration 364 collide with downlink symbols 370 of the second TDD configuration 366. That is, an uplink transmission 362 from the aggressor UE 352 may interfere with a downlink transmission 360 at the victim UE 358. The victim UE 358 can be a UE experiencing CLI.

In some wireless communication systems, such as wireless communication systems operating according to Release 16 of the 3GPP Standard, a UE may measure and report CLI. For example, the UE may measure CLI by measuring an SRS received on a serving reception beam, and the UE may report a CLI metric based on the CLI measurement. The CLI metric may include, for example, an SRS-reference signal received power (RSRP) and/or a CLI-received signal strength indicator (RSSI). Additionally, such wireless communication systems may specify one or more network coordination mechanisms for exchanging TDD configurations between two or more network devices, such as UEs. Such wireless communication systems may also configure a network device, such as a UE, to identify conditions of coexistence among different operators in adjacent channels. Finally, in such wireless communication systems, a receiving UE may measure and report interference based on radio resource control (RRC) configurations and network information exchange (e.g., over Xn and F1 interfaces). In some examples, an aggressor UE may be unaware of the CLI caused by its uplink transmissions.

As described above, a CLI metric may be determined based on a CLI measurement. In most cases, dedicated measurement gaps may not be specified for CLI measurements. The CLI measurement may measure one or both of a sounding reference signal-reference signal received power (SRS-RSRP) or a cross-link information-received signal strength indicator (CLI-RSSI). Other types of reference signal measurements are also contemplated for the CLI measurements. In one implementation, the SRS-RSRP and the CLI-RSSI are measured in an active bandwidth part (BWP) of a UE while the UE is in a connected modem such as an RRC_CONNECTED mode. The active BWP refers to a UE's operating bandwidth within a cell's operating bandwidth. The UE may be configured with multiple BWP. The UE may not transmit or receive on deactivated BWPs.

For the SRS-RSRP, the UE measures a linear average of the power contributions of the SRS. The measurements may be performed over resource elements configured within a measurement frequency bandwidth. The measurements may also be performed in one or more measurement occasions. Each measurement occasion may be configured in a time resource, such as a slot of a subframe.

For the CLI-RSSI, the UE measures a linear average of a total received power observed in certain orthogonal frequency division multiplexing (OFDM) symbols received during one or more measurement occasions. The measurements may be performed over configured resource elements of measurement bandwidth.

A UE may transmit a CLI measurement report after performing determining a CLI metric, such as an SRS-RSRP and/or a CLI-RSSI. The CLI measurement reports may be transmitted periodically or transmitted based on a trigger. In one implementation, the trigger is an event, such as an amount of interference exceeding an interference threshold (e.g., event 11). In this example, the UE may transmit the CLI measurement report when the amount of interference exceeds the interference threshold. In some implementations, layer 3 (L3) filtering may be applied to values of the CLI measurement reports to reduce unwanted handovers due to high CLI values. For CLI measurements, such as a CLI-RSSI measurement, the UE may reset the L3 filtering upon a BWP switch.

In conventional systems, a transmitting UE may receive a reference signal measurement configuration identifying transmitter spatial relation information for transmitting a resource, such as an SRS, for CLI measurements. Additionally, in conventional systems, a receiving UE may receive a channel state information (CSI) measurement reception configuration identifying CSI resource information for receiving a CSI-reference signal (CSI-RS). In such systems, the UE may receive and measure the CSI-RS based on the CSI resource information. Still, the UE may not receive spatial relation information for a serving reception beam for receiving a resource, such as an SRS, for a CLI measurement. Therefore, for CLI measurements, the serving reception beam may be selected based on a UE's implementation.

As an example, the reference signal measurement configuration may configure an aggressor UE to transmit an SRS on beam one. However, because the serving reception beam is based on the UE's implementation, the serving reception beam may vary. In such an example, the UE may receive the SRS on beam two. Still, in this example, the base station may be aware of the CLI from transmission beam nine to reception beam two based on a previous measurement. It may be desirable for the base station to obtain a CLI metric for a different reception beam, such as beam one. Conventional systems do not provide a method for configuring the UE to determine a CLI metric for a serving reception beam specified by the base station. In one configuration, the base station configures the serving reception beam by including quasi-co-location (QCL) information for the serving reception beam in a reference signal measurement configuration, such as an SRS measurement configuration.

Aspects of the present disclosure are directed to including QCL information of a serving reception beam in a reference signal measurement configuration. The QCL information may include a QCL source and a QCL type. Aspects of the present disclosure are also directed to improving CLI reporting.

As discussed, the CLI metric may include one or both of an SRS-RSRP or a CLI-RSSI. In one configuration, in addition to reporting the SRS-RSRP and/or the CLI-RSSI for a given SRS resource of a serving reception beam, the victim UE also reports the QCL information of the serving reception beam. Based on the QCL information, the base station may determine a serving reception beam resource (e.g., ID) or a corresponding QCL in a transmission configuration indicator (TCI) state.

In certain systems, transmissions may be via multiple TCI states. In some examples, a TCI state is associated with a beam pair, antenna panel, antenna ports, antenna port groups, a QCL relation, and/or a transmission reception point (TRP). Thus, multi-TCI state transmission may be associated with multiple beam pairs, multiple antenna panels, and/or multiple QCL relations, which may be associated with one or more multiple TRPs. The TCI state indicates the QCL assumption that the UE may use for channel estimation.

In some conventional systems, the TCI state may generally indicate an association between a downlink reference signal and a corresponding QCL type. Based on the TCI state, a UE may determine a serving reception beam for receiving a transmission. The QCL type may be associated with a set of QCL parameters. The QCL type may include: QCL-TypeA (Doppler shift, Doppler spread, average delay, delay spread); QCL-TypeB Doppler shift, Doppler spread); QCL-TypeC (Doppler shift, average delay); or QCL-TypeD (spatial reception parameter).

In one configuration, the base station configures multiple serving reception beams. That is, QCL information is provided for each respective serving reception beam of the multiple serving reception beams. As such, for each SRS resource, the victim UE may measure an SRS received in the SRS resource on multiple serving reception beams. For example, the UE may perform a CLI measurement for each SRS received on reception beams nine, ten, eleven, and twelve. The multiple serving beams may be preconfigured for each measured SRS resource.

As described, the base station may configure the UE to perform a CLI measurement on different serving reception beams. By increasing a number of serving reception beams configured for a CLI measurement, the base station receives an increased number of CLI metrics received from the UE. The increase in the number of CLI metrics may improve the base station's decision making process for configuring future receptions at the UE as the base station may select a best serving reception beam from a variety of serving reception beams, in contrast to selecting the best serving reception beam from a limited number of serving reception beams. The best serving reception beam may be the serving reception beam with a lowest CLI metric (e.g., lowest CLI). Additionally, one or more of the UE's active serving reception beams may change due to blockage and/or other conditions. In some implementations, the UE may switch and re-select a serving reception beam based on the CLI metrics obtained for the multiple serving reception beams.

In one configuration, the victim UE reports multiple QCLs for each serving reception beam in a subset of the multiple serving reception beams. For example, if Z number of serving reception beams QCLs are configured as candidates for CLI measurements, the UE may report X number of serving reception beams QCLs, where a value of X is less than a value of Z. A serving reception beam configured as a candidate for a CLI measurement may be referred to as a candidate serving reception beam. The X number of serving reception beams may include one or both of a first set of serving reception beams or a second set of serving reception beams. Each serving reception beam in the first set of serving reception beams is associated with one of a top N CLI metric values from a set of CLI metrics. Additionally, each serving reception beam in the second set of serving reception beams is associated with a lowest P CLI metric values from the set of CLI metrics, where a value of P may be equal to or different from a value of N. The second set of CLI metrics includes a CLI metric for each serving reception beam in the second set of serving reception beams. The set of CLI metrics include a CLI metric, such as an SRS-RSRP and/or a CLI-RSSI, for each serving reception beam of the Z number of serving reception beams.

For example, a UE may perform six different CLI measurements to determine six different CLI metrics, such as six different SRS-RSRP values. The CLI measurements may be performed on an SRS received on six different serving reception beams (e.g., Z serving reception beams, where Z equals six). The six different CLI metrics are an example of a set of CLI metrics. In this example, the victim UE may report QCL information for the serving reception beams associated with CLI metrics with the two highest values (e.g., top N, where N equals two) from the set of CLI metrics and/or CLI metrics with the two lowest values (e.g., lower P, where P equals two) from the set of CLI metrics.

In one configuration, a threshold may be established for the highest metric values and/or the lowest metric values. For example, to report QCL information for the serving reception beams associated with the top two highest CLI metric values, each CLI metric value should be greater than a first threshold. As another example, to report QCL information for the serving reception beams associated with the top two lowest CLI metric values, each CLI metric value should be less than a second threshold.

The two highest CLI metric values indicate the two serving reception beams with the highest interference level. The serving reception beams with the highest interference level should be avoided to mitigate interference. The two lowest CLI metric values indicate the two serving reception beams with the lowest interference level. The serving reception beams with the lowest interference level should be given priority (e.g., preferred) over other serving reception beams.

Additionally, or alternatively, the UE may report statistics of the set of CLI metrics obtained from CLI measurements performed on multiple serving beams. For example, the UE may report an average CLI metric value, a minimum CLI metric value, and/or a maximum CLI metric value of the CLI metric values of the multiple serving beams.

Figure 4:
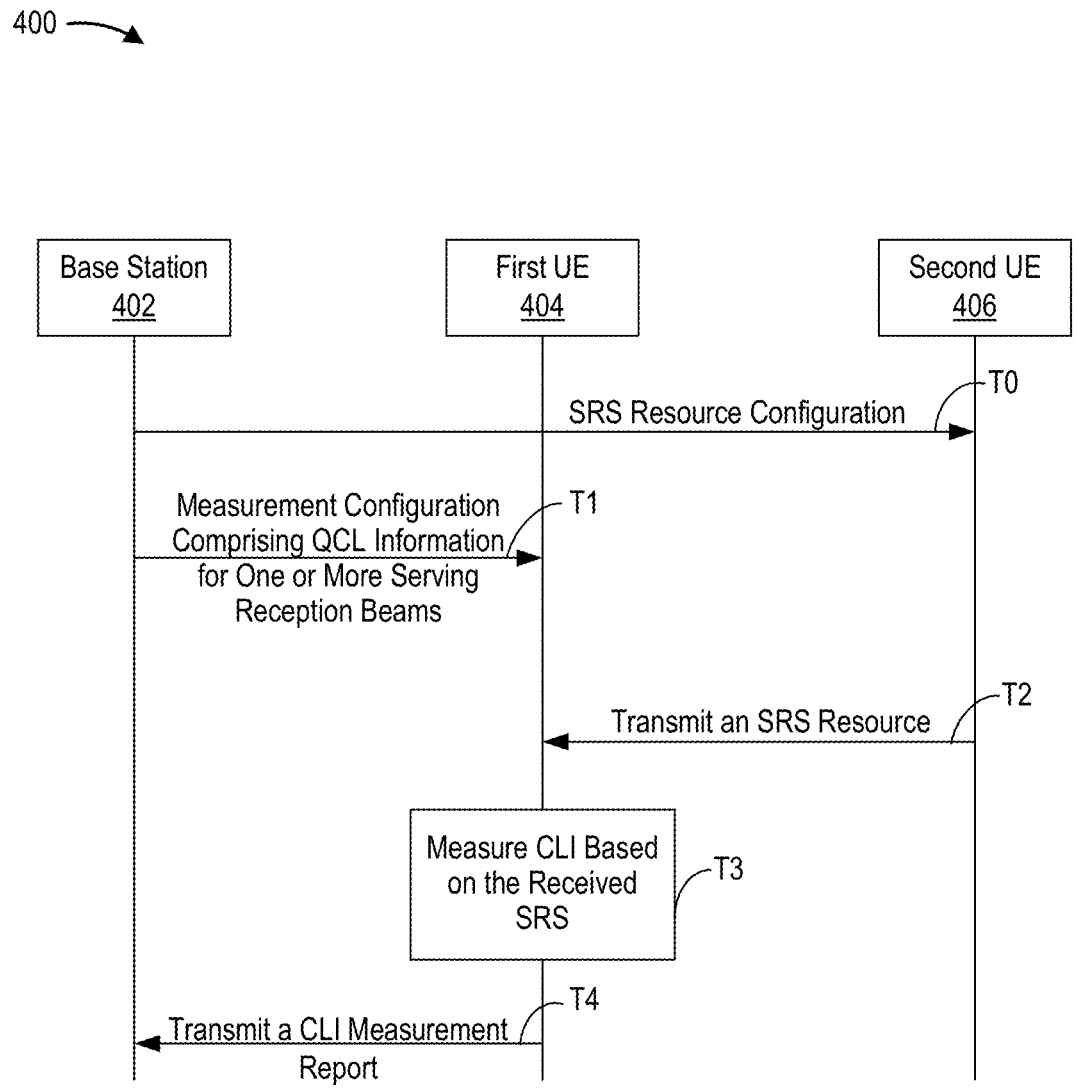
FIG. 4 illustrates an example of a timing diagram for measuring CLI, in accordance with aspects of the present disclosure.

FIG. 4 illustrates an example of a timing diagram 400 for measuring CLI, in accordance with aspects of the present disclosure. As shown in FIG. 4, at time T0, a base station 402 transmits a first SRS resource configuration to a second UE 406 to configure SRS transmissions by the second UE 406. The first SRS resource configuration may indicate spatial relation information for a transmission beam.

At time T1, a first UE 404 receives from the base station 402, for each SRS resource, a reference signal measurement configuration comprising QCL information for one or more serving reception beams. The reference signal measurement configuration may be an SRS measurement configuration for an SRS resource.

At time T2, the second UE 406 transmits an SRS to the first UE 404 in the SRS resource corresponding to the reference signal measurement configuration. The SRS may be received at the first UE 404 on one or more serving reception beams corresponding to QCL information included in the reference signal measurement configuration. At time T3, the first UE 404 performs a CLI measurement on the SRS received on the one or more serving reception beams configured by the base station 402. The CLI measurements may be performed in an active bandwidth part while the first UE 404 is in a connected mode. The first UE 404 determines a CLI metric based on the CLI measurement.

At time T4, the first UE 404 transmits a CLI measurement report including the QCL information for each respective serving reception beam of the one or more serving reception beams and a CLI metric corresponding to each CLI measurement. The QCL information may include a QCL source and a QCL type. Additionally, the CLI measurement report may be a layer 1 (L1) CLI measurement report or a layer 3 (L3) CLI measurement report. The base station 402 may identify one or more serving reception beam identifiers based on the reported QCL information. The first UE 404 may transmit the CLI measurement report in response to a trigger, or based on a configured periodicity.

The QCL information may be reported for one or both of a first set of the serving reception beams or a second set of the serving reception beams selected from multiple serving reception beams. In one implementation, each serving reception beam in the first set of serving reception beams is associated with one of a top N highest CLI metric values from a set of CLI metrics. Additionally, each serving reception beam in the second set of serving reception beams is associated with a lowest P CLI metric values from the set of CLI metrics, where P may be equal to or different from N.

The set of CLI metrics may be based on CLI measurements performed for each serving reception beam of a number of serving reception beams (e.g., Z serving reception beams), where the first set of the serving reception beams and the second set of the serving reception beams are subsets of the number of serving reception beams. Additionally, or alternatively, the first UE 404 may report statistics of the set of CLI metrics for the serving reception beams. The statistics may include an average CLI metric value, a minimum CLI metric value, and/or a maximum CLI metric value.

In the example of FIG. 4, the first UE 404 may be an example of a victim UE experiencing CLI and the second UE 406 may be an example of an aggressor UE. The CLI may be inter-cell interference or intra-cell interference.

As indicated above, FIGS. 3A, 3B, and 4 are provided as examples. Other examples may differ from what is described with respect to FIGS. 3A, 3B, and 4.

Figure 5:
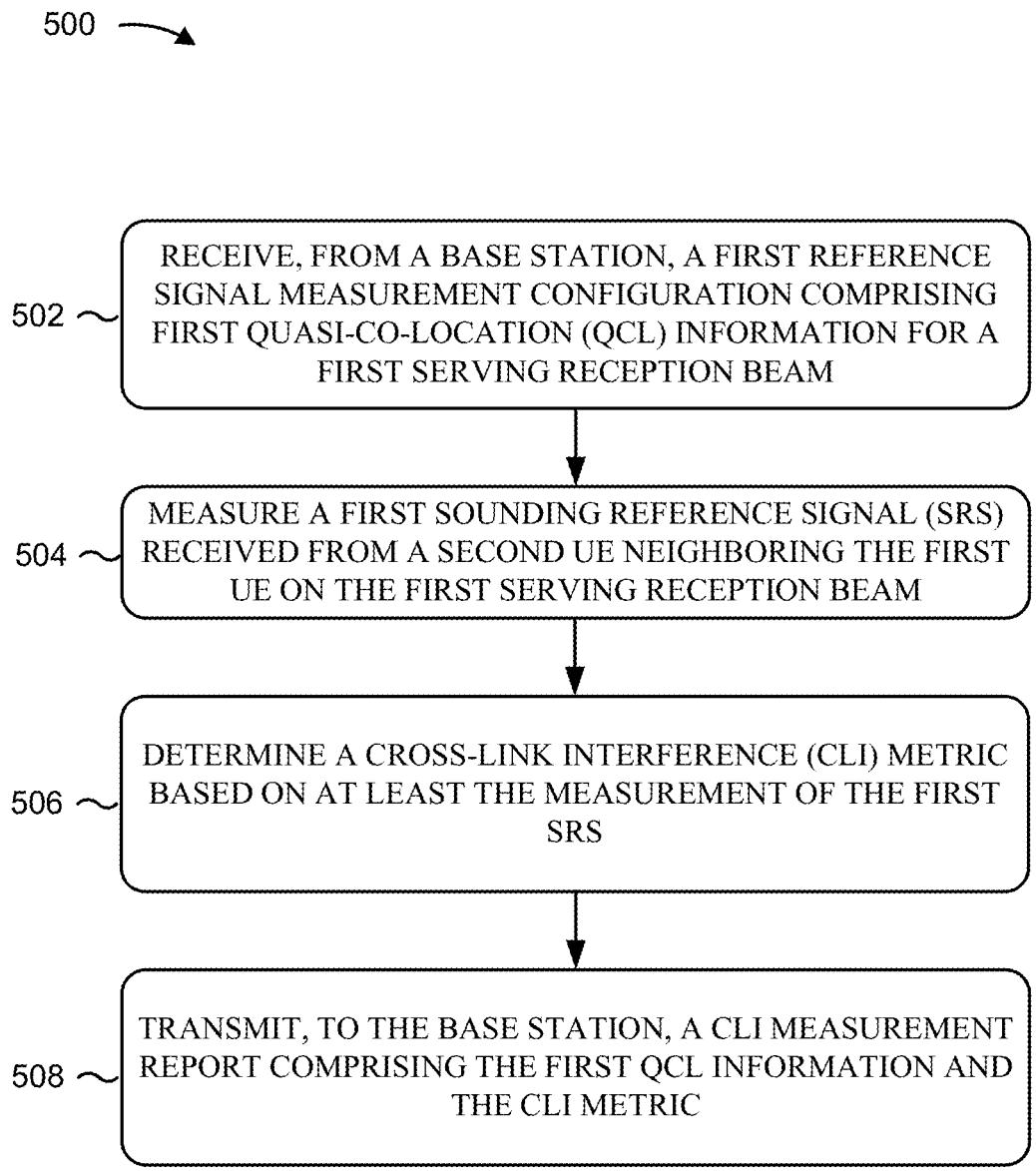
FIG. 5 is a diagram illustrating an example process performed, for example, by a UE, in accordance with various aspects of the present disclosure.

FIG. 5 is a diagram illustrating an example process 500 performed, for example, by a first UE, in accordance with various aspects of the present disclosure. The example process 500 is an example of improved CLI measurements and reporting. In the example of FIG. 5, the first UE may experience CLI from uplink transmissions of a second UE. The first UE may be an example of a UE 120, 308, 358, and 404, as described with reference to FIGS. 1, 2, 3A, 3B, and 4. The second UE may be an example of a UE 120, 302, 352, and 406, as described with reference to FIGS. 1, 2, 3A, 3B, and 4. The base station may be an example of a base station 110, 312, 356, and 402, as described with reference to FIGS. 1, 2, 3A, 3B, and 4.

As shown in FIG. 5, at block 502, the first UE receives, from a base station, a first reference signal measurement configuration comprising first quasi-co-location (QCL) information for a first serving reception beam. In some examples, the first reference signal measurement configuration may also include QCL information, each respective QCL information corresponding to a different respective serving reception beam of a number of serving reception beams. The serving reception beams may be pre-configured. In some examples, the first reference signal measurement configuration includes a SRS-reference signal received power (SRS-RSRP) measurement configuration resource for the first serving reception beam.

In some implementations, the first UE may also measure a number of SRSs, each SRS of the number of SRSs received on different respective serving reception beam of the number of serving reception beams. In such implementations, the first UE may also determine a number of CLI metrics based on the measurements of the number of SRSs. In such implementations, each CLI metric may correspond to a different respective SRS of the number of SRSs, and the number of CLI metrics include the first CLI metric. In some such implementations, the CLI measurement report further includes a set of QCL information, in which each QCL information of the set of QCL information corresponds to a different respective reception beam of a set of serving reception beams including one or both of a first set of serving reception beams from the number of serving reception beams or a second set of serving reception beams from the number of serving reception beams. In such implementations, each one of the first set of serving reception beams may be associated with a highest metric value from the number of CLI metrics, and each one of the second set of serving reception beams may associated with a lowest metric value from the number of CLI metrics. In other implementations, the CLI metric includes one or more of an average value, a minimum value, or a maximum value determined from the number of CLI metrics At block 504, the first UE measures a first SRS received from a second UE neighboring the first UE on the first serving reception beam. In some implementations, the first SRS may be measured in an active bandwidth part in a connected mode. At block 506, the first UE determines a cross-link interference (CLI) metric based on at least the measurement of the first SRS. At block 508, the first UE transmits, to the base station, a CLI measurement report comprising the first QCL information and the CLI metric. In some examples, the CLI metric includes one or both of an SRS-reference signal received power (SRS-RSRP) or a CLI-received signal strength indicator (CLI-RSSI). Additionally, the CLI measurement report may include a layer 1 (L1) CLI measurement report or a layer 3 (L3) CLI measurement report.

Figure 6:
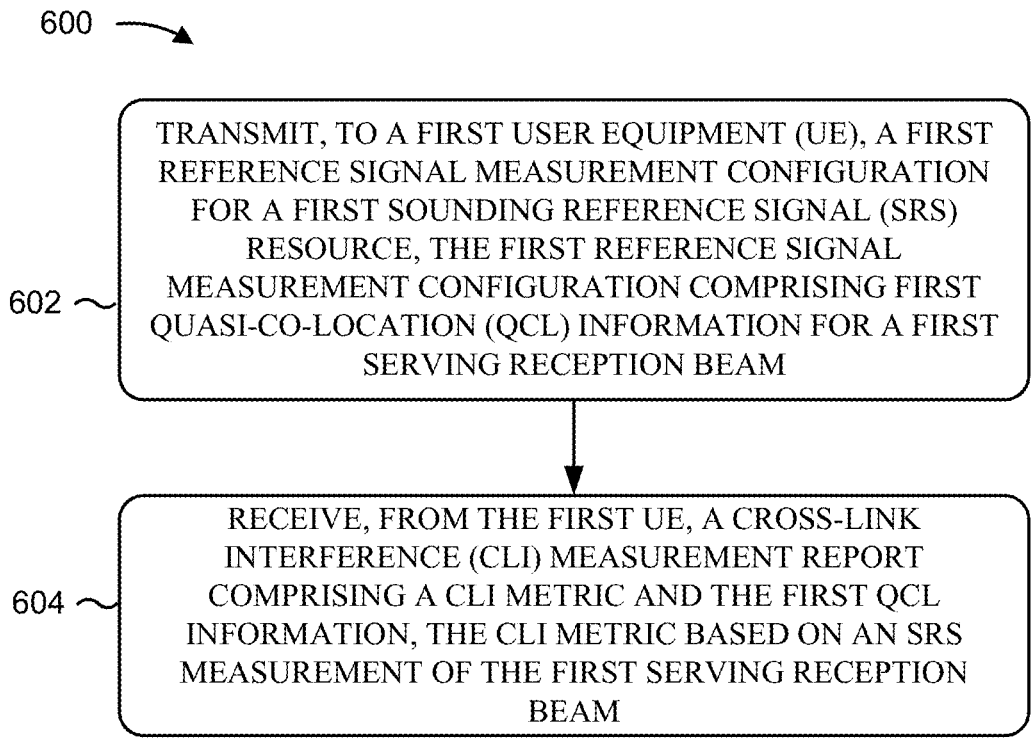
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. The example process 600 is an example of improved CLI measurements and reporting.

At block 602, the base station transmits, to a first user equipment (UE), a first reference signal measurement configuration for a first sounding reference signal (SRS) resource, the first reference signal measurement configuration comprising first quasi-co-location (QCL) information for a first serving reception beam. The first QCL information may include a QCL source and a QCL type. In some examples, the first reference signal measurement configuration also includes QCL information, in which each respective QCL information corresponds to a different respective serving reception beam of a number of serving reception beams, and the QCL information includes the first QCL information. In some examples, the serving reception beams may be preconfigured. In some other examples, the first reference signal measurement configuration includes an SRS-reference signal received power (SRS-RSRP) measurement configuration resource for the first serving reception beam.

At block 604, the base station receives, from the first UE, a cross-link interference (CLI) measurement report comprising a CLI metric and the first QCL information, the CLI metric based on an SRS measurement of the first serving reception beam. The CLI measurement report may also include a set of QCL information. In such examples, each QCL information of the set of QCL information corresponds to a different respective reception beam of a set of serving reception beams including one or both of a first set of serving reception beams from the number of serving reception beams or a second set of serving reception beams from the number of serving reception beams. Additionally, each one of the first set of serving reception beams may be associated with a highest metric value from a number of CLI metrics, and each one of the second set of serving reception beams may be associated with a lowest metric value from the number of CLI metrics. In some implementations, each CLI metric of the number of CLI metrics is based on an SRS measurement of a different respective serving reception beam of the number of serving reception beams. In other implementations, the CLI metric includes one or more of an average value, a minimum value, or a maximum value for a set of CLI metrics for the number of serving reception beams.

In some examples, the CLI measurement report may be received in response to a trigger. In some other examples, the CLI measurement report may be received based on a configured periodicity. The CLI metric may include one or both of a SRS-reference signal received power (SRS-RSRP) or a CLI-received signal strength indicator (CLI-RSSI). Additionally, the CLI measurement report comprises a layer 1 (L1) CLI measurement report or a layer 3 (L3) CLI measurement report.

In some implementations, the base station may transmit a number of reference signal measurement configurations, in which each respective reference signal measurement configuration corresponds to a different respective SRS resource of a number of SRS resources. In such implementations, the number of SRS resources includes the first SRS resource. Additionally, the number of reference signal measurement configurations includes the first reference signal measurement configuration. In some implementations, the base station may adjust a downlink transmission to the first UE based on the received CLI measurement report.

Implementation examples are described in the following numbered clauses:

1. A method of wireless communication performed by a first user equipment (UE), comprising:
    receiving, from a base station, a first reference signal measurement configuration comprising first quasi-co-location (QCL) information for a first serving reception beam;
    measuring a first sounding reference signal (SRS) received from a second UE neighboring the first UE on the first serving reception beam;
    determining a cross-link interference (CLI) metric based on at least the measurement of the first SRS; and
    transmitting, to the base station, a CLI measurement report comprising the first QCL information and the CLI metric.
2. The method of clause 1, wherein the CLI metric comprises one or both of an SRS-reference signal received power (SRS-RSRP) or a CLI-received signal strength indicator (CLI-RSSI).
3. The method of any of clauses 1-2, wherein the CLI measurement report comprises a layer 1 (L1) CLI measurement report or a layer 3 (L3) CLI measurement report.
4. The method of any of clauses 1-3, wherein the first reference signal measurement configuration further comprises a plurality of QCL information, each QCL information of the plurality of QCL information corresponding to a different respective serving reception beam of a plurality of serving reception beams, and the method further comprises:
    measuring a plurality of SRSs, each SRS of the plurality of SRSs received on different respective serving reception beam of the plurality of serving reception beams; and
    determining a plurality of CLI metrics based on the measurements of the plurality of SRSs, each CLI metric of the plurality of CLI metrics corresponding to a different respective SRS of the plurality of SRSs, and the plurality of CLI metrics comprising the first CLI metric.
5. The method of clause 4, wherein the CLI measurement report further comprises a set of QCL information, each QCL information of the set of QCL information corresponding to a different respective reception beam of a set of serving reception beams comprising one or both of a first set of serving reception beams from the plurality of serving reception beams or a second set of serving reception beams from the plurality of serving reception beams, each one of the first set of serving reception beams associated with a highest metric value from the plurality of CLI metrics, and each one of the second set of serving reception beams associated with a lowest metric value from the plurality of CLI metrics.
6. The method of clause 4, wherein the CLI metric comprises at least one of an average value, a minimum value, or a maximum value determined from the plurality of CLI metrics.
7. The method of clause 4, wherein the plurality of serving reception beams are preconfigured.
8. The method of any of clauses 1-7, wherein the QCL information comprises a QCL source and a QCL type.
9. The method of any of clauses 1-8, further comprising receiving a plurality of reference signal measurement configurations, each reference signal measurement configuration of the plurality of reference signal measurement configurations corresponds to a different respective sounding reference signal (SRS) resource of a plurality of SRS resources, the plurality of SRS resources comprising the first SRS resource, and the plurality of reference signal measurement configurations comprising the first reference signal measurement configuration.
10. The method of any of clauses 1-9, further measuring the first SRS comprises measuring the first SRS in an active bandwidth part in a connected mode.
11. The method of any of clauses 1-10, wherein the first reference signal measurement configuration comprises a SRS-reference signal received power (SRS-RSRP) measurement configuration resource for the first serving reception beam.
12. The method of any of clauses 1-11, wherein the first UE experiences CLI from uplink transmissions of the second UE.
13. The method of any of clauses 1-12, further comprising transmitting the CLI measurement report in response to a trigger.
14. The method of any of clauses 1-13, further comprising transmitting the CLI measurement report based on a configured periodicity.
15. A method of wireless communication, by a base station, comprising:
transmitting, to a first user equipment (UE), a first reference signal measurement configuration for a first sounding reference signal (SRS) resource, the first reference signal measurement configuration comprising first quasi-co-location (QCL) information for a first serving reception beam; and
receiving, from the first UE, a cross-link interference (CLI) measurement report comprising a CLI metric and the first QCL information, the CLI metric based on an SRS measurement of the first serving reception beam.
16. The method of clause 15, wherein the first reference signal measurement configuration comprises a plurality of QCL information, each QCL information of the plurality of QCL information corresponds to a different respective serving reception beam of a plurality of serving reception beams, and the plurality of QCL information comprises the first QCL information.
17. The method of clause 16, wherein the CLI measurement report further comprises a set of QCL information, each QCL information of the set of QCL information corresponding to a different respective reception beam of a set of serving reception beams comprising one or both of a first set of serving reception beams from the plurality of serving reception beams or a second set of serving reception beams from the plurality of serving reception beams, each one of the first set of serving reception beams associated with a highest metric value from a plurality of CLI metrics, and each one of the second set of serving reception beams associated with a lowest metric value from the plurality of CLI metrics.
18. The method of clause 17, wherein each CLI metric of the plurality of CLI metrics is based on an SRS measurement of a different respective serving reception beam of the plurality of serving reception beams.
19. The method of clause 17, wherein the CLI metric comprises at least one of an average value, a minimum value, or a maximum value for a set of CLI metrics for the plurality of serving reception beams.
20. The method of clause 16, wherein the plurality of serving reception beams are preconfigured.
21. The method of any of clauses 15-20, wherein the first QCL information comprises a QCL source and a QCL type.
22. The method of any of clauses 15-21, wherein the first reference signal measurement configuration comprises an SRS-reference signal received power (SRS-RSRP) measurement configuration resource for the first serving reception beam.
23. The method of any of clauses 15-22, wherein the first UE experiences CLI from uplink transmissions of a second UE.
24. The method of any of clauses 15-23, further comprising receiving the CLI measurement report in response to a trigger.
25. The method of any of clauses 15-24, further comprising receiving the CLI measurement report based on a configured periodicity.
26. The method of any of clauses 15-25, wherein the CLI metric comprises one or both of a SRS-reference signal received power (SRS-RSRP) or a CLI-received signal strength indicator (CLI-RSSI).
27. The method of any of clauses 15-26, wherein the CLI measurement report comprises a layer 1 (L1) CLI measurement report or a layer 3 (L3) CLI measurement report.
28. The method of any of clauses 15-27, further comprising transmitting a plurality of reference signal measurement configurations, each reference signal measurement configuration of the plurality of reference signal measurement configurations corresponds to a different respective SRS resource of a plurality of SRS resources, the plurality of SRS resources comprising the first SRS resource, and the plurality of reference signal measurement configurations comprising the first reference signal measurement configuration.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment (UE), comprising:
   receiving, from a base station, a first reference signal measurement configuration comprising first quasi-co-location (QCL) information for a first serving reception beam;
   measuring a first sounding reference signal (SRS) received from a second UE neighboring the first UE on the first serving reception beam;
   determining a cross-link interference (CLI) metric based on at least the measurement of the first SRS; and
   transmitting, to the base station, a CLI measurement report comprising the first QCL information and the CLI metric, the first QCL information includes a QCL source and a QCL type of the first serving reception beam associated with the CLI metric.

2. The method of claim 1, wherein the CLI metric comprises one or both of an SRS-reference signal received power (SRS-RSRP) or a CLI-received signal strength indicator (CLI-RSSI).

3. The method of claim 1, wherein the CLI measurement report comprises a layer 1 (L1) CLI measurement report or a layer 3 (L3) CLI measurement report.

4. The method of claim 1, wherein the first reference signal measurement configuration further comprises a plurality of QCL information, each QCL information of the plurality of QCL information corresponding to a different respective serving reception beam of a plurality of serving reception beams, and the method further comprises:
   measuring a plurality of SRSs, each SRS of the plurality of SRSs received on different respective serving reception beam of the plurality of serving reception beams; and
   determining a plurality of CLI metrics based on the measurements of the plurality of SRSs, each CLI metric of the plurality of CLI metrics corresponding to a different respective SRS of the plurality of SRSs.

5. The method of claim 4, wherein the CLI measurement report further comprises a set of QCL information, each QCL information of the set of QCL information corresponding to a different respective reception beam of a set of serving reception beams comprising one or both of a first set of serving reception beams from the plurality of serving reception beams or a second set of serving reception beams from the plurality of serving reception beams, each one of the first set of serving reception beams associated with a highest metric value from the plurality of CLI metrics, and each one of the second set of serving reception beams associated with a lowest metric value from the plurality of CLI metrics.

6. The method of claim 4, wherein the CLI metric comprises at least one of an average value, a minimum value, or a maximum value determined from the plurality of CLI metrics.

7. The method of claim 4, wherein the plurality of serving reception beams are preconfigured.

8. The method of claim 1, further comprising receiving a plurality of reference signal measurement configurations, each reference signal measurement configuration of the plurality of reference signal measurement configurations corresponds to a different respective sounding reference signal (SRS) resource of a plurality of SRS resources, the plurality of SRS resources comprising the first SRS resource, and the plurality of reference signal measurement configurations comprising the first reference signal measurement configuration.

9. The method of claim 1, further measuring the first SRS comprises measuring the first SRS in an active bandwidth part in a connected mode.

10. The method of claim 1, wherein the first reference signal measurement configuration comprises a SRS-reference signal received power (SRS-RSRP) measurement configuration resource for the first serving reception beam.

11. The method of claim 1, wherein the first UE experiences CLI from uplink transmissions of the second UE.

12. The method of claim 1, further comprising transmitting the CLI measurement report in response to a trigger.

13. The method of claim 1, further comprising transmitting the CLI measurement report based on a configured periodicity.

14. An apparatus for wireless communications at a user equipment (UE), comprising:
   a processor;
   a memory coupled with the processor; and
   instructions stored in the memory and operable, when executed by the processor, to cause the apparatus:

to receive, from a base station, a first reference signal measurement configuration comprising first quasi-co-location (QCL) information for a first serving reception beam;
to measure a first sounding reference signal (SRS) received from a second UE neighboring the first UE on the first serving reception beam;
to determine a cross-link interference (CLI) metric based on at least the measurement of the first SRS; and
to transmit, to the base station, a CLI measurement report comprising the first QCL information and the CLI metric, the first QCL information indicates a QCL source and a QCL type of the first serving reception beam associated with the CLI metric.

15. A method of wireless communication, by a base station, comprising:
transmitting, to a first user equipment (UE), a first reference signal measurement configuration for a first sounding reference signal (SRS) resource, the first reference signal measurement configuration comprising first quasi-co-location (QCL) information for a first serving reception beam; and
receiving, from the first UE, a cross-link interference (CLI) measurement report comprising a CLI metric and the first QCL information, the CLI metric based on an SRS measurement of the first serving reception beam, the first QCL information indicates a QCL source and a QCL type of the first serving reception beam associated with the CLI metric.

16. The method of claim 15, wherein the first reference signal measurement configuration comprises a plurality of QCL information, each QCL information of the plurality of QCL information corresponds to a different respective serving reception beam of a plurality of serving reception beams, and the plurality of QCL information comprises the first QCL information.

17. The method of claim 16, wherein the CLI measurement report further comprises a set of QCL information, each QCL information of the set of QCL information corresponding to a different respective reception beam of a set of serving reception beams comprising one or both of a first set of serving reception beams from the plurality of serving reception beams or a second set of serving reception beams from the plurality of serving reception beams, each one of the first set of serving reception beams associated with a highest metric value from a plurality of CLI metrics, and each one of the second set of serving reception beams associated with a lowest metric value from the plurality of CLI metrics.

18. The method of claim 17, wherein each CLI metric of the plurality of CLI metrics is based on an SRS measurement of a different respective serving reception beam of the plurality of serving reception beams.

19. The method of claim 17, wherein the CLI metric comprises at least one of an average value, a minimum value, or a maximum value for a set of CLI metrics for the plurality of serving reception beams.

20. The method of claim 16, wherein the plurality of serving reception beams are preconfigured.

21. The method of claim 15, wherein the first reference signal measurement configuration comprises an SRS-reference signal received power (SRS-RSRP) measurement configuration resource for the first serving reception beam.

22. The method of claim 15, wherein the first UE experiences CLI from uplink transmissions of a second UE.

23. The method of claim 15, further comprising receiving the CLI measurement report in response to a trigger.

24. The method of claim 15, further comprising receiving the CLI measurement report based on a configured periodicity.

25. The method of claim 15, wherein the CLI metric comprises one or both of a SRS-reference signal received power (SRS-RSRP) or a CLI-received signal strength indicator (CLI-RSSI).

26. The method of claim 15, wherein the CLI measurement report comprises a layer 1 (L1) CLI measurement report or a layer 3 (L3) CLI measurement report.

27. The method of claim 15, further comprising transmitting a plurality of reference signal measurement configurations, each reference signal measurement configuration of the plurality of reference signal measurement configurations corresponds to a different respective SRS resource of a plurality of SRS resources, the plurality of SRS resources comprising the first SRS resource, and the plurality of reference signal measurement configurations comprising the first reference signal measurement configuration.

28. An apparatus for wireless communications at a base station, comprising:
a processor;
a memory coupled with the processor; and
instructions stored in the memory and operable, when executed by the processor, to cause the apparatus:
to transmit, to a first user equipment (UE), a first reference signal measurement configuration for a first sounding reference signal (SRS) resource, the first reference signal measurement configuration comprising first quasi-co-location (QCL) information for a first serving reception beam; and
to receive, from the first UE, a cross-link interference (CLI) measurement report comprising a CLI metric and the first QCL information, the CLI metric based on an SRS measurement of the first serving reception beam, the first QCL information indicates a QCL source and a QCL type of the first serving reception beam associated with the CLI metric.

* * * * *